United States Patent
Kakimi

[11] Patent Number: 6,059,304
[45] Date of Patent: May 9, 2000

[54] SUSPENSION DEVICE WITH CRANK TYPE AXLE

[76] Inventor: Tomio Kakimi, 100, Oaza-Shimoyamada, Kohoku-Cho, Higashiazai-Gun, Shiga, 529-0300, Japan

[21] Appl. No.: 09/091,173
[22] PCT Filed: Oct. 16, 1997
[86] PCT No.: PCT/JP97/03755
§ 371 Date: Jun. 9, 1998
§ 102(e) Date: Jun. 9, 1998
[87] PCT Pub. No.: WO98/16417
PCT Pub. Date: Apr. 23, 1998

[30] Foreign Application Priority Data

Oct. 17, 1996 [JP] Japan .................................. 8-274355

[51] Int. Cl.[7] .................................................. B60B 35/06
[52] U.S. Cl. ...................................... 280/124.11; 280/229
[58] Field of Search ........................ 280/124.11, 124.116, 280/229; 301/127

[56] References Cited

U.S. PATENT DOCUMENTS

| 3,448,992 | 6/1969 | Wilfert et al. ................ 280/124.116 |
| 3,737,173 | 6/1973 | Boissier et al. ....................... 280/684 |
| 3,990,725 | 11/1976 | Allison ............................. 280/124.146 |
| 4,793,630 | 12/1988 | Schuit .............................. 280/124.104 |

FOREIGN PATENT DOCUMENTS 0 314 414 A2  5/1989  European Pat. Off. .

*Primary Examiner*—Kevin Hurley
*Assistant Examiner*—Andrew J. Fischer
*Attorney, Agent, or Firm*—Milde, Hoffberg & Macklin, LLP

[57] ABSTRACT

The invention provides a simplified, light-weight, and an inexpensive suspension device which is capable of absorbing and mitigating shock and oscillation caused by projections and recesses on the road surface. To achieve the above object, the invention has embodied a suspension device 10 comprising the following: a main crank shaft 14 being rotatably supported by a shaft supporter 12 secured to a main body frame, a pair of crank arms 16 and 18 extending themselves substantially orthogonally from both ends of the main crank shaft 14 in the direction inverse from each other, and a pair of crank pins 24 and 26 being set projectively to edge portions of said crank arms 16 and 18 and housing wheels 20 and 22 by coupling therewith. Directions of a pair of crank arms 16 and 18 extending themselves in the inverse directions respectively form a predetermined angle by way of centering around the main crank shaft 14.

9 Claims, 6 Drawing Sheets

SUSPENSION DEVICE WITH CRANK TYPE AXLE

FIELD OF THE INVENTION

The present invention relates to a suspension device based on a crank-type shaft, more particularly, to a suspension device based on a crank-type shaft capable of performing stable movement against projections and recesses on the road surface or against turning movement.

BACKGROUND OF ART

Any of conventional automobiles and motor-cycles is equipped with suspension devices between chassis and shaft via springs and shock-absorbers in order to relax swinging motion caused by differential steps or projections and recesses on the road surface or tilt in the course of making a turn thereby making it possible to perform stable run. However, any of conventional bicycles, tricycles, baby carriages, handcarts, or trucks being devoid of said suspension devices causes slight projections or recesses on the road to directly affect its body to cause the user to sense discomfort. In particular, any of those vehicles using small wheels devoid of pneumatic tires can not deal with slight differential steps or tilt to result in the difficulty to perform stable run.

Figure 12:
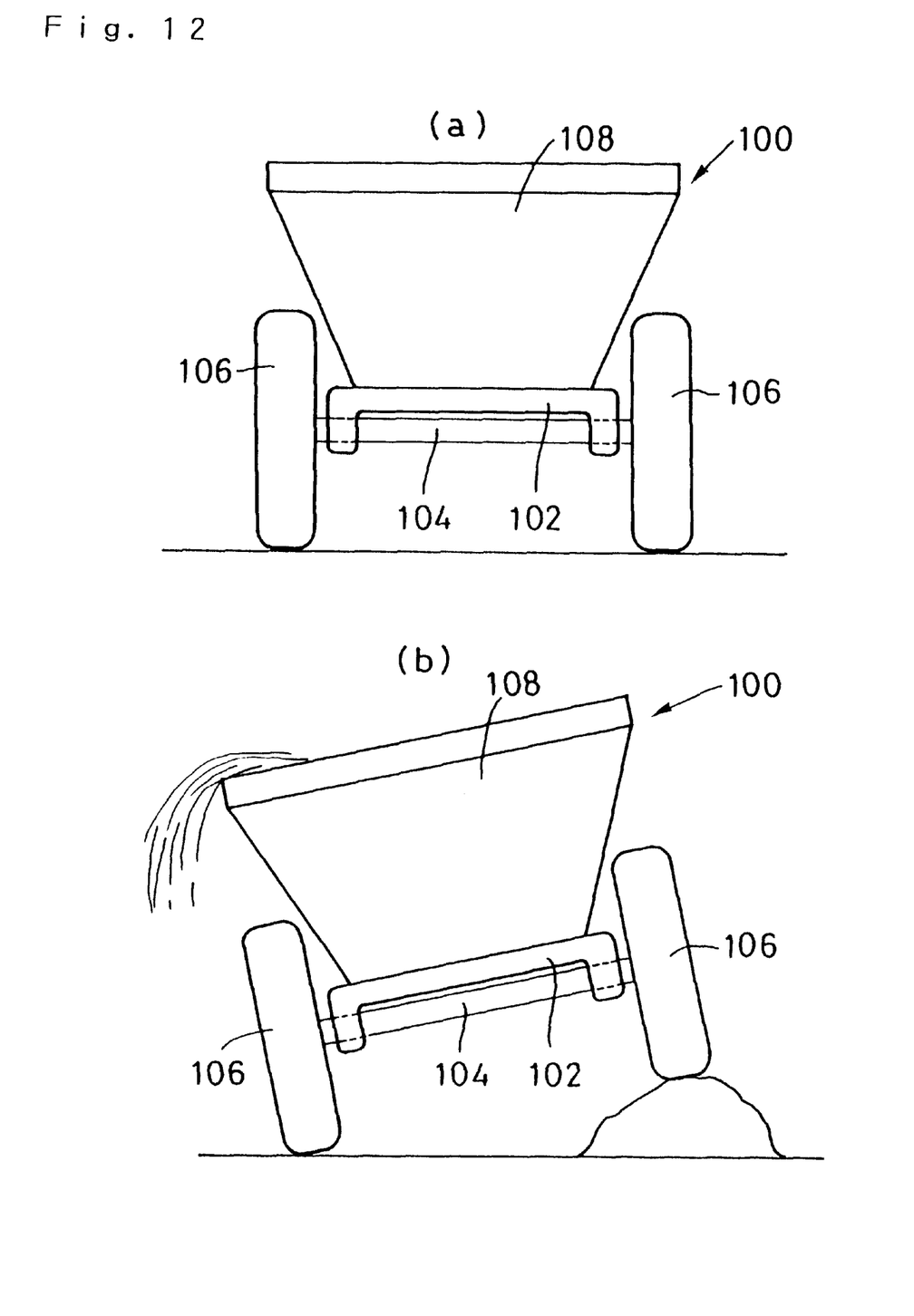
FIG. 12(a) is a front view for showing a two-wheeled carriage using a conventional fixed shaft.
FIG. 12(b) is a front view for explanatory of operation thereof.

For example, as shown in FIG. 12, an explanation is hereby given by way of exemplifying a two-wheeled handcraft 100 having an extremely simple-structured fixed shaft. A pair of wheels 106 is set to the left/right ends of a shaft 104, where a frame 102 with a handle is set to the upper part of the shaft 104, and yet, a bucket 108 is set to the frame 102. For example, when an operator carries a loaded bucket 108 by way of holding the frame 102 via the handle, he can deal with incline in the forward/backward direction (i.e., in the forwarding direction) on the road surface. However, if the road surface ever inclines in the leftward or rightward direction (being orthogonal to the forwarding direction), not only the wheels 106 and the bucket 108, but the load itself is also obliged to tilt as per the incline on the road surface to cause the load to fall off from the bucket to result in the failure to convey the load.

As is obvious from the above case, such a conventional two-wheeled handcraft having a fixed shaft can not totally balance itself in the left and right directions, and yet, since projections or recesses on the road surface directly affect the handcraft body, such a conventional handcraft has been limitedly usable for conveying load under a very slow conveying rate. Likewise, similar results are generated from most of those vehicles being devoid of suspension devices such as a baby carriage or a truck equipped with several units of two-wheels having a fixed shaft of the above kind.

Accordingly, inventors of the present invention followed up studies in order to provide a simplified buffer corresponding to such a vehicle being devoid of the above-cited suspension device or such a vehicle having difficulty to fix any conventional suspension device thereto and finally achieved conception that has led to materialization of a novel suspension device based on a crank-type shaft related to the invention.

DISCLOSURE OF THE INVENTION

The suspension device based on a crank-type shaft related to the present invention featuring the following structure: a main crank shaft being rotatably supported by a shaft supporter secured to a main body frame, a pair of crank arms extending themselves substantially orthogonally from both ends of the main crank shaft in the direction inverse from each other, and a pair of crank pins being set projectively to edge portions of said crank arms and housing wheels by coupling therewith.

Structurally, when a main crank shaft supported by a shaft supporter is rotated, crank arms and crank pins are rotated by way of pivoting on the main crank shaft, wherein simultaneously with rotation of one of the crank arms, the other crank arm is also rotated. In this suspension device, when the center of gravity acts substantially on the center of the main crank shaft, the main crank shaft is positioned being substantially level in the leftward and rightward directions, whereas the crank arms are positioned being substantially level in the forward and backward directions. Assuming that when a vehicle runs in the state just mentioned above, if one of wheels rides on a projected obstacle present on the road surface, the wheel is rotated upward in the manner of forming circular-arc via the radius formed by one of the crank arms by way of pivoting on the main crank shaft and then lifted in correspondence with height of the projected obstacle. Simultaneously, the other crank arm and wheel are rotated in the downward direction by way of pivoting on the main crank shaft to cause the main crank shaft to be lifted via fulcrum formed by the road surface. When this condition is generated, the main crank shaft is lifted by such a height corresponding to the range in which the other crank arm and wheel are rotated downward. Conversely, in such a case in which one of wheels falls into a recess for example, operation is activated in the manner totally being inverse from the above sequence to cause the main crank shaft to be lowered by such a range in which the other crank arm and wheel are rotated. Accordingly, ascending and descending movements of the main crank shaft are reduced by half in proportion to height of a projected obstacle and depth of a recess on the road surface to cause shock given to the main-body frame to be mitigated drastically.

When the center of gravity is substantially at the center of the main crank shaft, the main crank shaft is positioned substantially being level. However, when the center of gravity shifts and biasedly acts on either of the left and right sides, the main crank shaft is biased to the side on which the center of gravity acts to cause crank arms to be rotated, wherein one of the crank arms is rotated upward, whereas the other crank arm is rotated downward. Accordingly, wheels also incline to the side on which the center of gravity acts itself. In such a vehicle equipped with the suspension device related to the invention, wheels can be inclined in correspondence with incline of the vehicle's body caused by shift of the center of gravity. In consequence, the vehicle can exert distinctive turning performance. In this way, the vehicle can be rotated via such an operating sense substantially similar to that is sensed via operation of any conventional two-wheeled motorcycle or bicycle.

As is apparent from the above, the suspension device based on the crank-type shaft related to the invention does not require any complex structure such as the one assembled with springs and shock-absorbers, but the invented suspension device mitigates shock solely via rotation of a simplified crank shaft, thus making it possible to perform stable run. In particular, the invented suspension device exerts distinctive effect in mitigation of shock against running device and turning performance, which have been ignored so far in the case of small-radial wheels. Further, since the suspension device of the present invention dispenses with springs mainly related to buffering effect, neither reaction nor resonance is generated, thus yielding epoch-making effect. Moreover, since the invented suspension device is of simple structure, it features lightweight, inexpensive cost and trouble-free safety device.

The suspension device 32 based on a crank-type shaft has a pair of said crank arms extending themselves in the inverse directions, which are so structured that angles formed in the directions of their rotations are asymmetrical.

By virtue of introducing the above structure, when the center of gravity is substantially at the center of the main crank shaft, the main crank shaft is positioned substantially being level, where a pair of crank arms respectively face opposite directions back and forth by way of pivoting on the main crank shaft to cause tip portions of the crank arms to be positioned upward against substantially levelled posture by a predetermined angular difference. Next, when the center of gravity acts to cause itself to biasedly act on either of the left and right sides of the main crank shaft, the main crank shaft is biased toward the side affected by the center of gravity. One of the crank arms is rotated upward, whereas the other crank arm is rotated downward. Even when one of the crank arms has reached perpendicular position being the furthest rotational range, the other crank arm remains at a inclined position without reaching perpendicular position by such an amount corresponding to angular difference between both crank arms. In this way, since both of the crank arms are not simultaneously positioned at perpendicularity, in other words, since dead points of a pair of crank arms do not overlap themselves, crank arms are smoothly rotatable, thus making it possible to smoothly restore their postures from leftward or rightward incline to the levelled posture.

Further, the suspension device based on a crank-shaft has a pair of said crank arms extended in the inverse directions, which are so structured that they can freely move themselves within a predetermined angular range by way of centering around said main crank shaft.

By virtue of introducing the above structure, even when a pair of crank arms invert their rotations to either of the forward and backward directions, tip portions of the crank arms are constantly positioned upward against substantially levelled posture by such an amount corresponding to a predetermined angular difference. Accordingly, the main crank shaft being affected by weight of the vehicle's body constantly remains beneath the position at which a pair of crank pins are interlinked, and thus positional stability is secured.

BEST FORM FOR EMBODYING THE INVENTION

Referring now to the accompanying drawings, embodiments of the suspension device based on a crank-type shaft related to the invention are described below.

Figure 1:
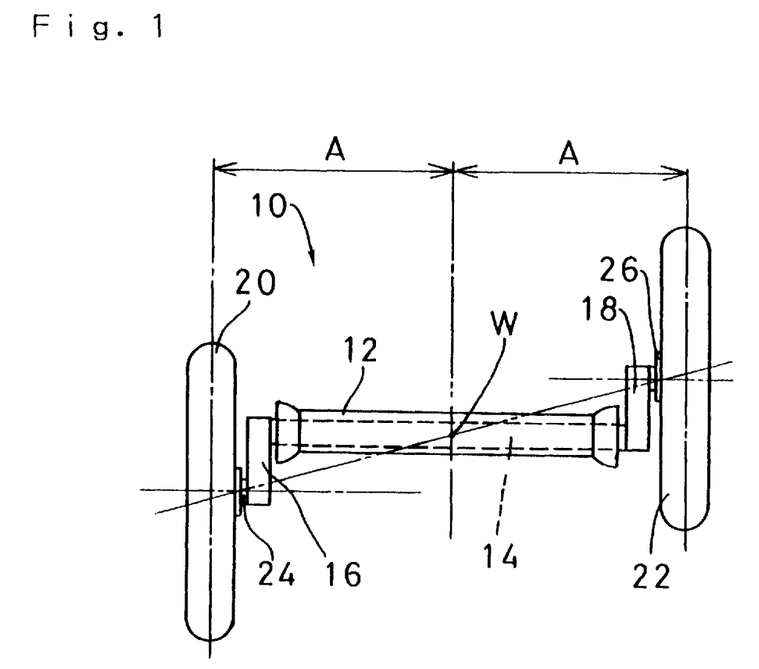
FIG. 1 is a plan for explanatory of basic structure of the suspension device related to the invention.

As exemplified in FIG. 1, the suspension device 10 based on a crank-type shaft according to embodiments of the invention comprises the following: a main crank shaft 14, a pair of crank arms 16 and 18 extending themselves respectively from both ends of the main crank shaft 14 in the substantially orthogonal direction and in the opposite directions, and a pair of crank pins 24 and 26 which are projectively and outwardly set to left and right edge portions of the crank arms 16 and 18 in the state being parallel with the main crank shaft 14. The suspension device 10 is secured with a pair of wheels 20 and 22 respectively having a rotational shaft comprising the crank pins 24 and 26. A 12 rotatably holding the main crank shaft 14 is secured to a frame not being illustrated. Accordingly, when the main crank shaft 14 is rotated against the shaft supporter 12, the crank arms 16/18 and the crank pins 24/26 are rotated by way of pivoting on the main crank shaft 14. When the crank arm 16 is rotated, the other crank arm 18 is simultaneously rotated.

In the suspension device 10 featuring the structure described above, as shown in FIG. 2 and FIG. 3, while the center of gravity W acting on the suspension device 10 acts itself on the intermediate portion between the wheels 20 and 22, in other words, while the center of gravity W acts itself on the substantially center portion of the main crank shaft, the main crank shaft 14 is positioned in level in the leftward and rightward directions, whereas the crank arms 16 and 18 are positioned substantially in level in the forward and backward directions. However, when workable position of the center of gravity W shifts to the left or to the right (B shown in FIG. 3), the crank arms 16 and 18 are rotated within an angular range between the horizontal position and the perpendicular position in response to the positional shift of the center of gravity W to cause the main crank shaft 14 to be biased to the side at which the center of gravity W exerts action.

Figure 3:
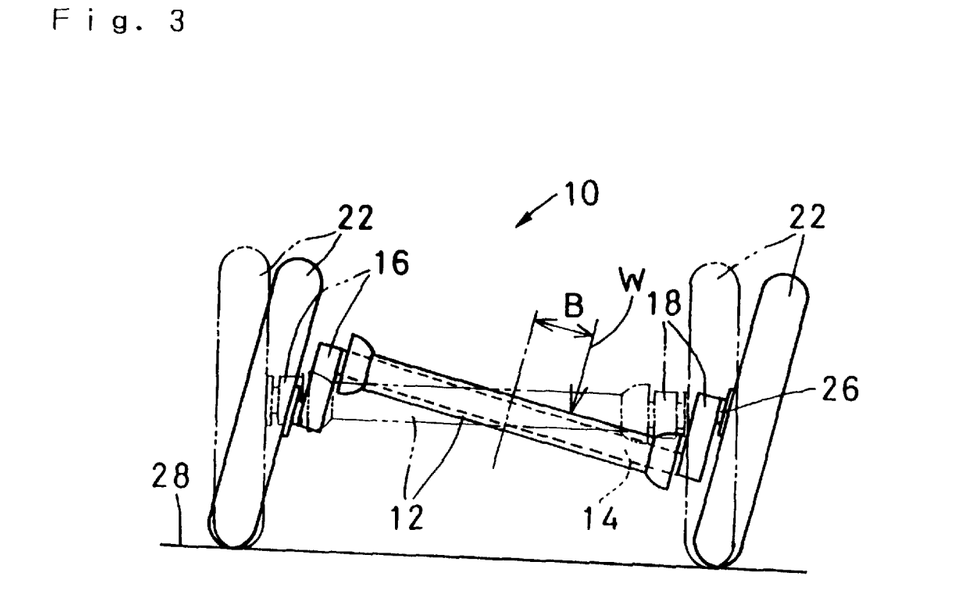
FIG. 3 is a front view for explanatory of another operation of the suspension device shown in FIG. 1.

Accordingly, while a vehicle runs on a substantially levelled plane road, the both-side wheels 20 and 22 stand themselves in the substantially perpendicular direction. However, while a vehicle turns curves at a relatively high speed, when workable position of the center of gravity W is biased to the turning side, as shown in FIG. 3, the main crank shaft 14 and the both side wheels 20 and 22 incline themselves in correspondence with workable position of the center of gravity W to enable the vehicle to stably perform a turning movement by way of resisting centrifugal force. In consequence, turning performance is distinctly promoted.

Figure 2:
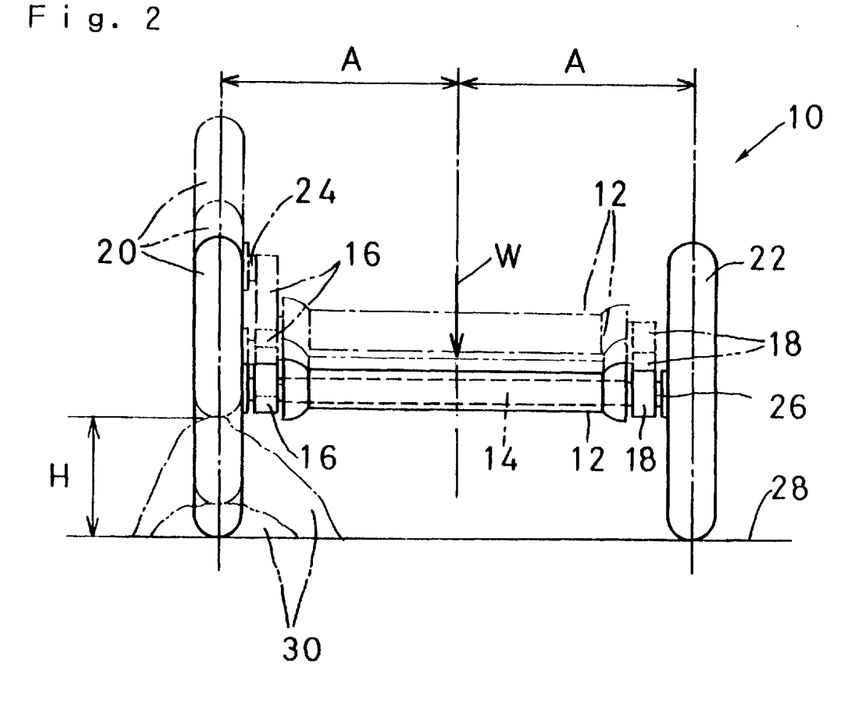
FIG. 2 is a front view for explanatory of operation of the suspension device shown in FIG. 1.
Figure 4:
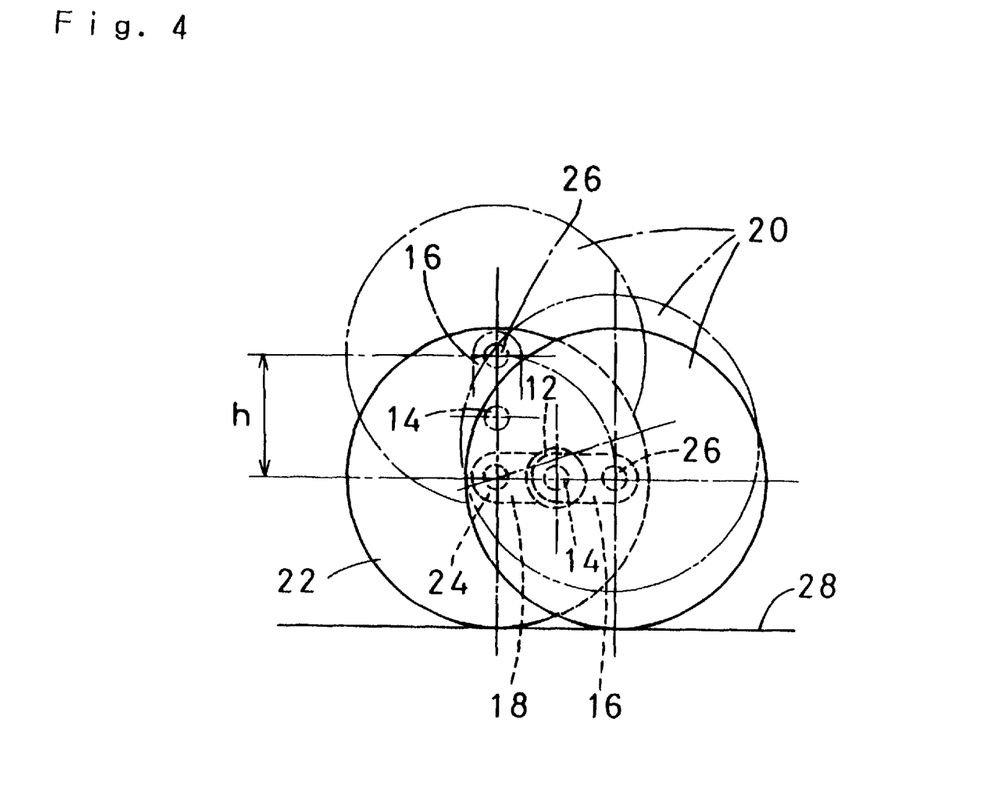
FIG. 4 is a lateral view for explanatory of operation of the suspension device shown in FIG. 1.

Referring now to FIG. 2 and FIG. 4, if there were a projected obstacle 30 on the road surface 28 on the way of running a vehicle while the center of gravity W acts itself onto the center of the main crank shaft 14 and then one-side wheel 20 rides on the projected obstacle 30, then, the wheel 20 rotates itself upwardly in the manner of forming a circular-arc based on a radius formed with the crank arm 16 by way of pivoting on the main crank shaft 14. This enables the wheel 20 to ascend itself in correspondence with actual height of the projected obstacle 30. Simultaneously, the other crank arm 18 and the other wheel 22 rotate themselves downwardly by way of pivoting on the main crank shaft 14 to cause the main crank shaft 14 to be lifted via a fulcrum formed by the road surface 28. While performing this operation, the main crank shaft 14 is lifted by such a height corresponding to the amount of the rotation performed by the crank arm 18. Conversely, even when one-side wheel 20 falls into a recess, workable operation is totally inverse from the above case by causing the main crank shaft 14 to be lowered by such an amount corresponding to the rotation performed by the crank arm 18.

In either of the above-referred cases, insofar as height of the projected obstacle 30 or depth of the recess is within a range of the sum of the length of the crank arms 16 and 18, the main crank shaft 14 can be held at the substantially level. More particularly, the main crank shaft 14 inclines itself when height "h" between both side wheels 20 and 22 (as of the moment when the crank arms 16 and 18 being held at the level have jointly reached the perpendicular position via respective rotations) is less than actual height "H" of the projected obstacle 30.

As is apparent from the above description, since the ascending and descending movements of the main crank shaft 14 are saved by half the ascending and descending movements of the wheel 20, shock inflicted on the frame or chassis on the shaft supporter 12 sustaining the main crank shaft 14 from the road surface is drastically mitigated.

The wheels 20 and 22 being secured respectively to the crank pins 24 and 26 deviate themselves in the forward/backward direction against the main crank shaft 14 by the length of the crank arms 16 and 18. By virtue of this structure, when a vehicle passes differential steps being substantially parallel with the main crank shaft 14, the wheels 20 and 22 do not simultaneously ride on differential steps, but instead, both wheels alternately ride on said steps to enable them to effectively and smoothly perform operation. As is clear from the above description, the suspension device 10 based on the crank-type shaft according to an embodiment of the invention does not require such a complex structure assembled with springs and shock-absorbers, but shock can be mitigated only via the rotation of a simple-structured crank shaft, thus enabling the vehicle to stably perform run. In particular, the suspension device based on the invention mitigates shock against running devices provided for small-radial wheels, which have been ignored so far, and significantly promotes turning performance thereof.

In the above-referred suspension device 10 shown in FIG. 1, an inventive form is exemplified, in which a pair of crank arms 16 and 18 are respectively secured by way of oppositely facing the main crank shaft 14 in the forward and backward directions. In an actual embodiment, depending on condition of the road surface, the front and rear arrangement of the crank arms 16 and 18 may be replaced by rotating themselves properly. If impropriety in terms of structural arrangement ever occurs via replacement of the front/rear arrangement of the crank arms 16 and 18, in order to eliminate impropriety and constantly facilitate restoration of overall levelness, it is suggested that wire ropes or springs be set between tip portion of either or both of the crank arms 16 and 18 and the frame or a stopper device be set between them to prevent the crank arms 16/18 from reaching dead point.

Structure and operation of the suspension device 10 based on a crank-type shaft according to a basic embodiment of the invention have thus been clarified in the above description. Next, form of a practical embodiment is described below.

Figure 5:
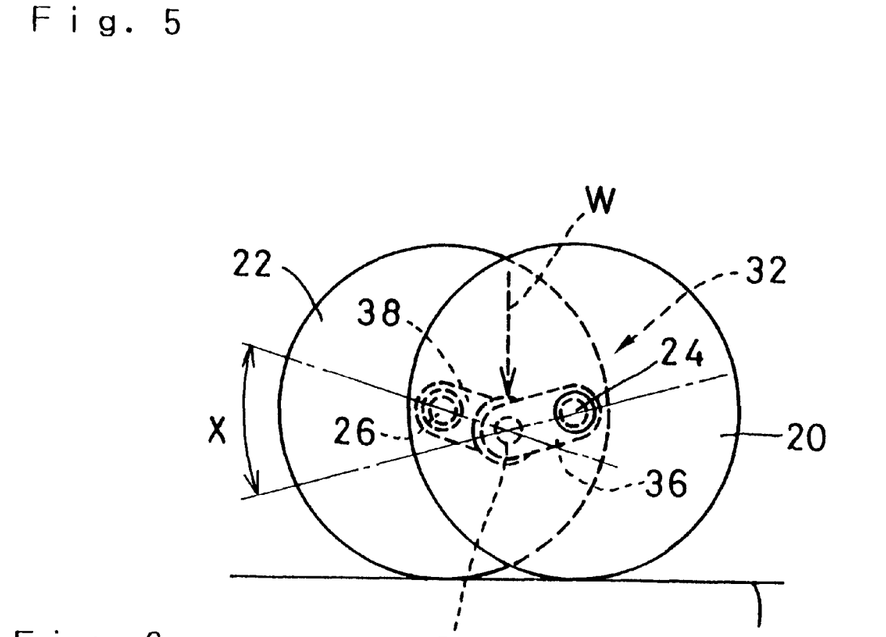
FIG. 5 is a lateral view for explanatory of another embodiment of the suspension device related to the invention.

As shown in FIG. 5, the suspension device 32 based on a crank-type shaft according to a practical embodiment has a pair of crank arms 36 and 38 extending themselves in the inverse directions, which are so structured that angles formed in the directions of their rotations are asymmetrical. More particularly, the suspension device 32 comprises the following: a main crank shaft 34 supported by a shaft supporter, a pair of crank arms 36 and 38 extending themselves substantially orthogonally from both ends of the main crank shaft 34 in the inverse directions, and a pair of crank pins 24 and 26 which are projectively set to one ends of the crank arms 36 and 38 and house wheels 20 and 22 by coupling therewith. A predetermined angular difference X is formed centering around the main crank shaft 34 as directional difference by a pair of said crank arms 36 and 38 extending themselves in the inverse directions. Such a predetermined angular difference X which is formed centering around the main crank shaft 34 by a pair of said crank arms 36 and 38 as directional difference may be approximately 20 degrees in normal cases. However, the angular difference X is not always defined to be 20 degrees.

In the suspension device 32 featuring the above structure, when the center of gravity W is present substantially at the center of the main crank shaft 34, the main crank shaft 34 is positioned substantially in level. A pair of crank arms 36 and 38 extend themselves in the inverse directions back and forth centering around the main crank shaft 34, where tip ends of the crank arms 36 and 38 are positioned substantially upwardly against the level by a predetermined angular difference (X/2).

Next, when the center of gravity W shifts and acts biasedly on either of the left and the right sides of the main crank shaft 34, the main crank shaft 34 inclines to the side affected by the center of gravity W to simultaneously cause the crank arms 36 and 38 to be rotated. In this case, one of the crank arms 36 and 38 is rotated upwardly, whereas the other crank arm 36 or 38 is rotated downwardly. In case this condition is generated, even when the crank arm 36 has reached perpendicular position which is the furthest rotative condition, the other crank arm 38 does not reach perpendicular position by such an amount corresponding to angular difference X between both crank arms 36 and 38, but the crank arm 38 is positioned obliquely. In this way, since the crank arms 36 and 38 are not simultaneously positioned perpendicularly, in other words, since respective dead points of a pair of crank arms 36 and 38 do not overlap each other, the crank arms 36 and 38 rotate themselves smoothly, thus enabling them to smoothly restore the level state from the leftward or rightward incline. Accordingly, after making a turn or traversing slant, the crank arms 36 and 38 smoothly rotate themselves to enable the main crank shaft 34 to restore the level position.

Figure 6:
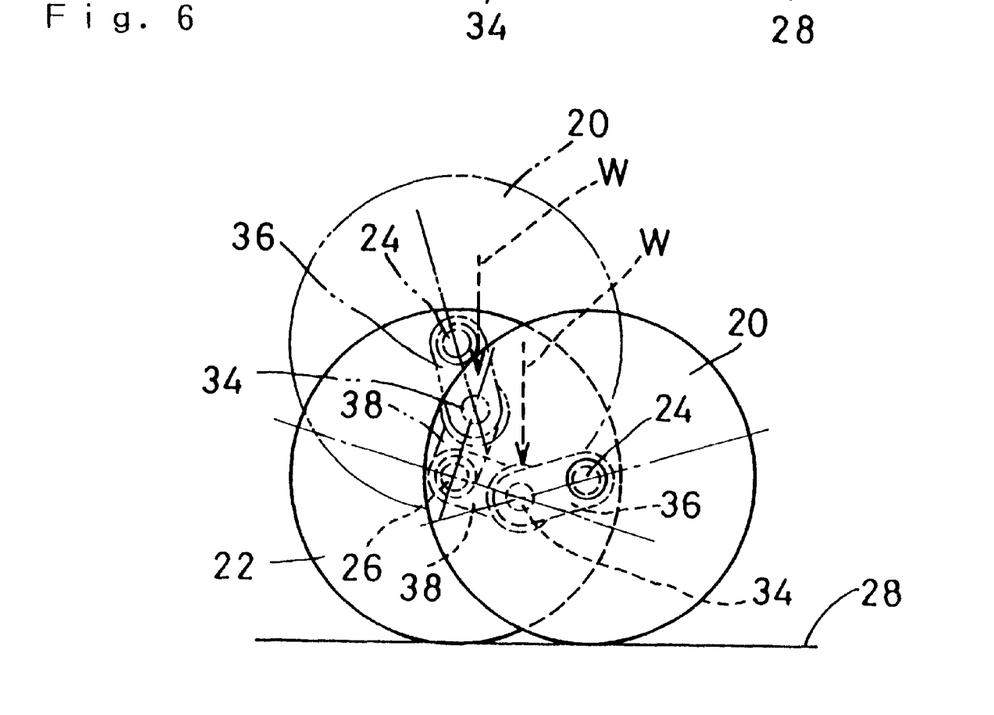
FIG. 6 is a lateral view for explanatory of another operation of the suspension device shown in FIG. 5.

Further, as shown in FIG. 6, while operating the suspension device 32, if the wheel 20 has reached the upper dead point position by riding on an obstacle, own weight (W) of the vehicle's body vertically affecting the main crank shaft 34 acts as moment onto line (plane) interlinking the crank pins 24 and 26. In other words, since the crank pin 24 being the center of the rotation of the wheel 20, the crank pin 26 being the center of the rotation of the wheel 22, and the main crank shaft 34, do not simultaneously overlap themselves on the identical vertical surface, operation for causing the wheels 20 and 22 to be back to the level direction is performed smoothly.

Figure 7:
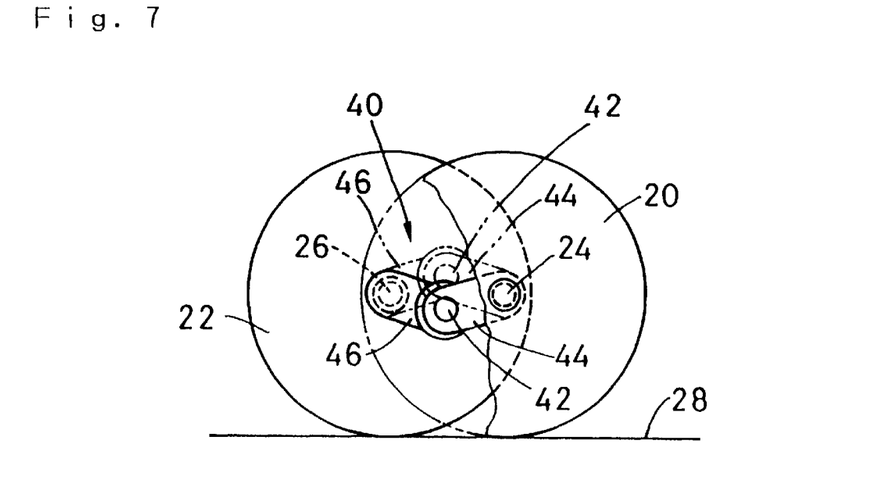
FIG. 7 is a lateral view for explanatory of a still further embodiment of the suspension device related to the invention.

Next, as shown in FIG. 7, the suspension device 40 based on a crank-type shaft according to another embodiment comprises the following: the main crank shaft 42 supported by a shaft supporter, a pair of crank arms 44 and 46 extending themselves substantially orthogonally from both ends of the main crank shaft 42 in the inverse directions, and a pair of crank pins 24 and 26 which are projectively set to edge portions of a pair of said crank arms 44 and 46 and house wheels 20 and 22 respectively by coupling therewith. Further, as shown via a solid line and a virtual line centering around the main crank shaft 42, the crank arms 44 and 46 extending themselves in the inverse directions are so structured that they can freely move themselves within a predetermined angular range.

Figure 8:
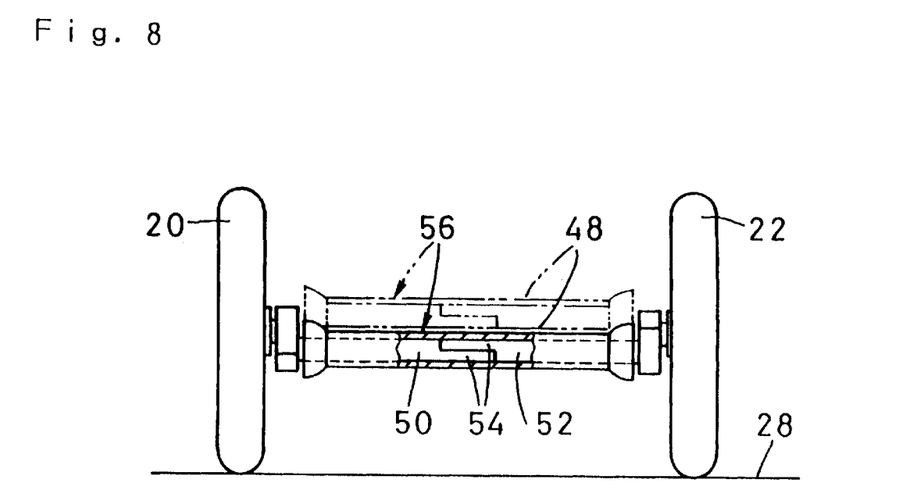
FIG. 8 is a front view for explanatory of an embodiment of the suspension device shown in FIG. 7.
Figure 9:
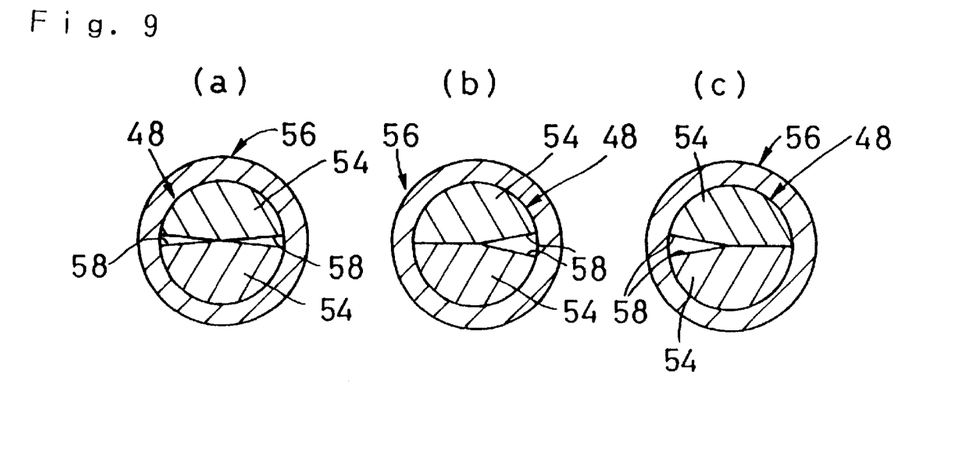
FIG. 9(a), 9(b), and 9(c) are respectively cross-sectional views of fundamental components for explanatory of operation of the suspension device shown in FIG. 8.

As a concrete example of the suspension device, as shown in FIG. 8 and FIG. 9(a), the main crank shaft 48 is split into a pair of main crank shafts 50 and 52. Semicylindrical portions 54 and 54 formed at the split ends of the split main crank shafts 50 and 52 are engagedly connected to each other inside of a cylindrical shaft supporter 56. As shown in FIG. 9(a), surface 58 engaged by semicylindrical portions 54 and 54 is cut to form properly angled space. Accordingly, as shown in FIG. 9(b) or 9(c), even when the front and rear positions of the crank arms 44 and 46 are replaced, surfaces 58 of the semicylindrical portions 54 and 54 come into contact with each other to form a predetermined angle.

Such a structure for enabling a pair of crank arms 44 and 46 to move freely against the main crank shaft 42 within a predetermined angular range is not limited to the above form. For example, slight play portion may be provided for the fitting portion of either or both of a pair of crank arms 44 and 46 secured to both ends of the main crank shaft 48. A variety of structures may also be introduced.

Next, practical application of the suspension device 10 based on the above-referred crank-type shaft is exemplified below.

By way of setting the suspension device 10 of the present invention to a two-wheeled handcart, operator can preserve balance freely in the forward-backward and left-right directions, and thus, the handcart incorporating the suspension device 10 is particularly effective in conveying cement or fluid material in a site of construction work for example.

Figure 10:
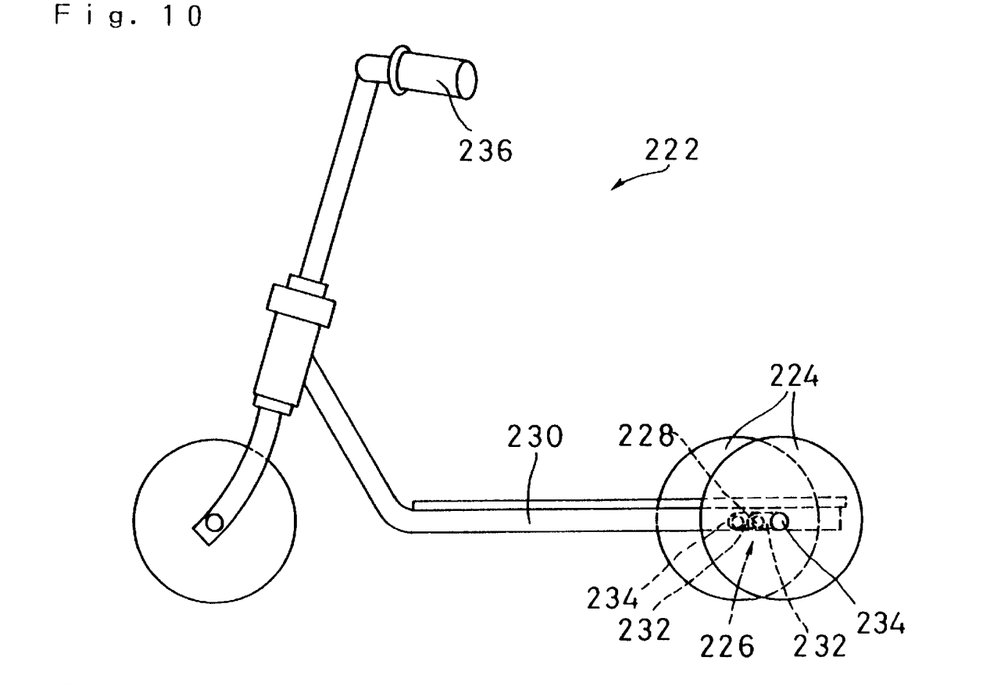
FIG. 10 is a lateral view for exemplifying a tricycle skate based on an application of an embodiment of the suspension device related to the invention.

Further, as shown in FIG. 10, the suspension device of the present invention is also applicable to a tricycle skate 222 for example, where the suspension device is used for a suspension device 226 provided for a pair of rear wheels 224 of a tricycle skate 222. A main crank shaft 228 is rotatably secured to a body frame 230 via a shaft supporter. A pair of crank pins 234 is projectively set to edge portions of a pair of crank arms 232 secured to both ends of the main crank shaft 228. A pair of rear wheels 224 is rotatably secured to the crank pins 234.

In the case of any conventional tricycle skates, the front wheel inclines to the turning side via handle operation. However, neither the rear wheels nor the main body can incline, and thus, because of difficulty to make a turn on the run, any of conventional tricycle skates has been used for skating on a straight line as a pleasing instrument. However, such a tricycle skate 222 incorporating the suspension device of the present invention enables both the rear wheels and the body to freely incline in correspondence with shift of the center of gravity on the way of making a turn, and yet, the tricycle skate 222 can deal with swift turn as well. Further, since oscillation and shock given to the tricycle skate body by small projections and recesses on the road surface can be mitigated by half the wheels, the tricycle skate 222 incorporating the suspension device of the present invention can be used as a comfortable pleasing instrument with high security potential.

Figure 11:
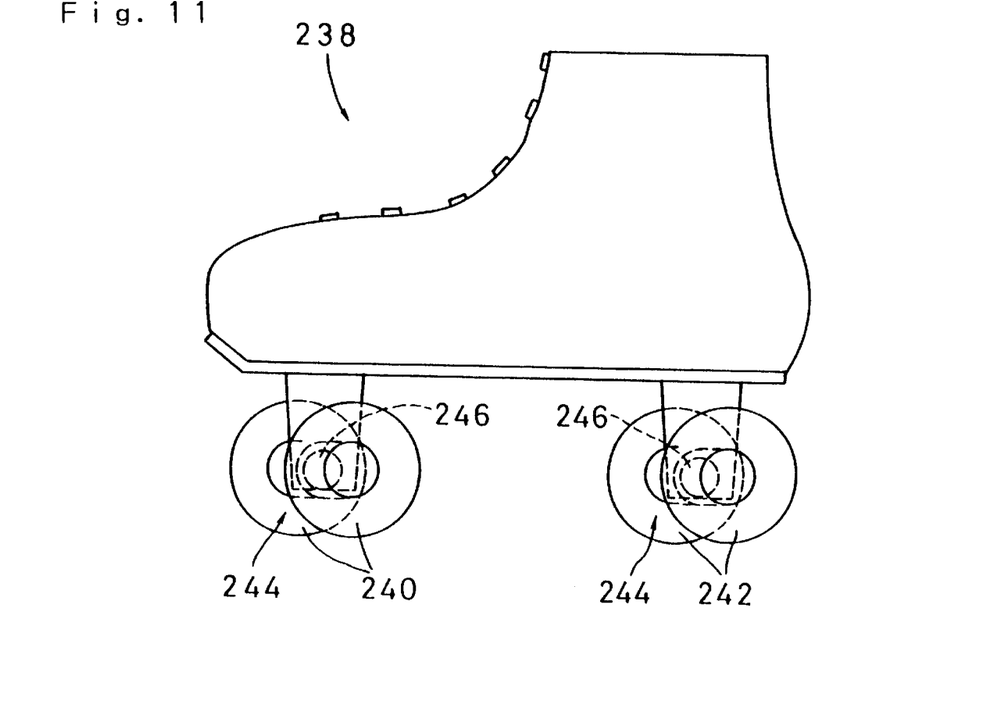
FIG. 11 is a lateral view for exemplifying a roller skate based on an application of a still further embodiment of the suspension device related to the invention.

Further, as shown in FIG. 11, the suspension device of the present invention is also applicable to a roller skate 238. Concretely, the suspension device 244 according to the invention is used for the front wheel 240 and the rear wheel 242. In operating such a roller skate 238 based on the above structure, it can freely follow up frequent inclining movements to the left and to the right caused by shift of operator's own weight on the way of run. Concretely, the front wheel 240 and the rear wheel 242 respectively cope with inclining movements by way of pivoting on the main crank shafts 246. Incase of operating any of conventional roller skates, since angle of its wheels in contact with road surface is structurally and constantly orthogonal, inclining and turning movements can not easily be performed. However, the present invention has made it possible to provide a novel roller skate featuring distinctively stable turning performance by solving said problem.

A variety of practical forms of the suspension device based on the crank-type shaft related to the invention and applied examples for embodying the invention have thus been described. However, the invention is not solely limited to the illustrated forms of embodiments.

It should be understood that individual elements of the main crank shaft, crank arms, and crank pins related to the suspension device of the present invention may also be formed by way of integration. Further, bearing portion may be provided with a shaft supporter, thus proper material can be applied to the invention. Further, it should be understood that the invention may be embodied by way of implementing a variety of improvements, modifications, and changes, based on knowledge of those skilled in the art within a scope that does not deviate from essentials of the invention.

INDUSTRIAL APPLICABILITY

The suspension device related to the invention is applicable to a variety of vehicles and playing instruments including casters such as trucks, baggage-cars for carrying load, handcarts, two-wheeled vehicles, tricycle skates, tricycles for children, overturn preventive supporting wheels, front-wheel steering wheels, skating board, baby carriages, etc. Conventional small-radial wheels are also replaceable with the wheels incorporating the inventive suspension device.

What is claimed is:

1. A suspension device coupled to wheels comprising;

(a) a rotatable main crank shaft having two opposite ends;

(b) a pair of crank arms extending substantially orthogonally from each end of said main crank shaft;

(c) crank pins secured projectively to an edge portion of each crank arm to support rotatably said wheels, wherein said crank arms extend in a direction opposite to each other and form, with respect to each other, an angle of less than 180 degrees.

2. The suspension device according to claim 1, wherein each of said crank arms are freely rotatable around said main crank shaft.

3. The suspension device according to claim 2, wherein said main crank shaft is split into two parts connected engagedly to each other at their split ends.

4. A vehicle having a front wheel and/or a rear wheel, wherein at least one of the front and rear wheels include a suspension device comprising:

(a) a rotatable main crank shaft having two opposite ends;

(b) a pair of crank arms extending substantially orthogonally from each end of said main crank shaft;

(c) crank pins secured projectively to an edge portion of each crank arm to support rotatably two wheels, wherein said crank arms extend in a direction opposite each other and form an angle, with respect to each other, of less than 180 degrees.

5. The vehicle according to claim 4, wherein each of said crank arms are freely rotatable around said main crank shaft.

6. The vehicle according to claim 5, wherein said main crank shaft is split into two parts connected engagedly to each other at their split ends.

7. A vehicle having a front wheel and a rear wheel, wherein the front wheel and the rear wheel include a suspension device comprising:

(a) a rotatable main crank shaft having two opposite ends;

(b) a pair of crank arms extending substantially orthogonally from each end of said main crank shaft;

(c) crank pins secured projectively to an edge portion of each crank arm to support rotatably two wheels, wherein said crank arms extend in a direction opposite to each other and form an angle, with respect to each other, of less than 180 degrees.

8. The vehicle according to claim 7, wherein each of said crank arms are freely rotatable around said main crank shaft.

9. The vehicle according to claim 8, wherein said main crank shaft is split into two parts connected engagedly to each other at their split ends.

* * * * *